United States Patent
Ganton

(10) Patent No.: US 7,071,727 B2
(45) Date of Patent: Jul. 4, 2006

(54) METHOD AND APPARATUS FOR MITIGATING RADIO FREQUENCY RADIATION FROM A MICROPROCESSOR BUS

(75) Inventor: Robert B. Ganton, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 501 days.

(21) Appl. No.: 10/367,235

(22) Filed: Feb. 14, 2003

(65) Prior Publication Data

US 2004/0174184 A1  Sep. 9, 2004

(51) Int. Cl.
*H03K 19/003* (2006.01)
(52) U.S. Cl. .......................................... 326/21; 326/26
(58) Field of Classification Search ................... 326/21
See application file for complete search history.

(56) References Cited

U.S. PATENT DOCUMENTS

| | | | | |
|---|---|---|---|---|
| 4,721,870 A | * | 1/1988 | Rector et al. | ................ 327/552 |
| 4,961,059 A | * | 10/1990 | Anderson | ..................... 333/19 |
| 6,853,321 B1 | * | 2/2005 | Ohashi et al. | .............. 341/144 |

* cited by examiner

*Primary Examiner*—James H. Cho

(57) ABSTRACT

A low-pass filter 10 on a microprocessor bus 22 for attenuating radio frequencies from digital signals travelling on the bus 22 from a microprocessor 12 to a peripheral device 20. An RC network is implemented as close as physically possible to the junction of the bus connection to microprocessor 12 and memory 14 to filter radio frequencies to an extent that limits radiation of these frequencies from the length of the bus 22. Wait states are adjusted as necessary to accommodate filtering of the digital signal that is transmitted over microprocessor bus 22.

11 Claims, 2 Drawing Sheets

METHOD AND APPARATUS FOR MITIGATING RADIO FREQUENCY RADIATION FROM A MICROPROCESSOR BUS

BACKGROUND OF THE INVENTION

1. Field of the Invention (Technical Field)

The present invention relates to the field of communication over microprocessor buses. In particular, the present invention relates to minimizing radio frequency radiation from a microprocessor bus resulting from digital communication over the bus.

2. Background Art

There are a variety of digital systems that rely on microprocessors for system control. Microprocessors control operations including user interaction—such as keypad decoding, modem operations, radio operations—if applicable, control of the display of data to a user, control of storage devices (memory) and control of other "peripheral" devices. "Peripheral" devices include, for example, displays, printers, scanners, digital cameras and memories as well as a variety of other devices. The microprocessor communicates with peripherals over a microprocessor bus.

Typically the microprocessor can operate at much higher speeds than the peripherals, and in particular at higher speeds than many low-cost memories. In order for a microprocessor to communicate effectively with a variety of peripherals having unique addresses and differing communication response periods, "wait states" are used so that the microprocessor does not send out signals to the peripheral at a speed that the peripheral cannot accommodate. The number of wait states used when communicating with a particular peripheral corresponds to the peripheral address. Wait states are additional machine cycles that provide additional access time for external memories or peripherals having slower response times. Such wait states give the peripherals time to receive and respond to the communication signal from the microprocessor, before the next signal is sent from the microprocessor. For example, a printer may require more wait states because the cables connecting it to the microprocessor are physically longer, resulting in a time delay between the time that the signal is sent and the time that it is received. A printer may also require more wait states because it operates at a slower rate and may be slower to respond and decode signals received. In contrast, a liquid crystal display (LCD) typically requires fewer wait states as it is often located more proximate to the microprocessor and has a fast response time.

Memory devices, as well as many other peripherals, typically are set to operate with the fastest achievable wait state because access is needed on a frequent basis. However, peripherals will operate effectively with a higher number of wait states than the minimum required for the response time, although implementation of a higher number of wait states will slow communication.

In addition to the need for control of the timing of communication over the microprocessor bus with wait states, other difficulties can arise from communication over the microprocessor bus. One such difficulty is that unwanted radio frequency interference (rfi) can radiate from the bus. Electromagnetic radiation is generated whenever electrical current travels along a conductor. This radiation can propagate to other devices in proximity to the conductor.

In the case of a digital pulse, the rate of change of the pulse voltage determines the frequency spectrum available to radiate. The frequency spectrum of a digital pulse traveling along a conductor, or microprocessor bus, can extend into the radio frequency (rf) range. For example, when a fast digital pulse travels along the microprocessor in a digital system, rf radiation is typically produced in the vicinity of the bus. The operating frequency of the microprocessor bus is the source of the fundamental frequency for radiation from the bus, and generally the strongest effects of rf interference are due to harmonics of this frequency. Further, a typical digital pulse transmitted along the microprocessor bus has a rise time from 0 volts to 3 volts in the range of 10 nsec. A rise time of this speed produces high frequencies, in the range of 100 MHz, which are more readily radiated from the bus because the relationship between the wavelength of these frequencies is closely matched to the physical size and geometry of the bus; the efficiency of radiation from a conductor at specific frequencies is dependent upon the geometry of the conductor.

The orientation of the bus to another device with which the bus may cause rfi, such as an antenna, effects the degree of interference experienced by the antenna. If the bus is both orthogonal to the antenna and minimal in length, then the antenna will have optimal interference rejection capability. However, if the bus is not orthogonal to the antenna and has a length of more than $\frac{1}{10}$ of the wavelength ($\lambda$) of the potentially radiated frequency, then the probability of rfi interfering with the receiving capability of the antenna increases.

Additional rf radiation from the bus can occur if it is not terminated correctly, because a reflected pulse can propagate back in the opposite direction from the terminal end of the bus.

Other factors contributing to rfi from a conductor, or bus, include the length of the conductor, and its proximity to a quality ground. A longer signal path typically results in increased total rf radiation, depending upon the wavelength of the conducted signal and the type of conductor.

Therefore, undesired rfi is emitted from the microprocessor bus when signals are transmitted between the microprocessor and peripheral. This interference can propagate to other electronic components in the vicinity of the microprocessor bus, via electromagnetic radiation or conduction, generating noise and interfering with their efficient and reliable operation.

One way to mitigate rfi from the microprocessor bus is to shorten the length of the bus. The disadvantages of shortening the length of a bus are obvious; the signal path length to peripherals is constrained by the length of the bus. This solution requires designing the landscape of the system components within the confines of the available signal path lengths.

Another way of mitigating rfi from the microprocessor bus is to provide Faraday cage shielding around the bus to confine the electromagnetic radiation, thereby inhibiting the radiation and conduction of the undesired rfi. The Faraday cage is typically placed around the microprocessor and peripheral device or devices. A disadvantage of Faraday shielding is that it requires the shield be made of metal, or at least metallized-plastic, which can be prohibitively expensive.

A third method used to mitigate rfi is to implement buffering schemes, or gating, in the path of the microprocessor bus. A buffer is used to prevent the passage of a signal beyond the location of the buffer. The buffer essentially operates as a switch allowing continuity of the signal path at those times when communication must occur between the microprocessor and the peripheral device. If the buffer is "off" no signals can pass the buffer, and radiation is not generated from the bus beyond that point. If the buffer is "on", signals are allowed to pass down the bus. Typically, such buffers are implemented with a simple digital logic gate. For example, to buffer a particular peripheral, a two-input AND gate is placed in the signal path between the microprocessor and peripheral. The data signal to the peripheral is fed into one input of the AND gate, and the enable for that peripheral is fed into the other input. The output from the gate corresponds to the data input, so long as the enable input is a digital high, equivalent to the "on" state.

Buffering is simple to implement and limits the occurrence of pulses causing rf radiation, but it does not eliminate the radiation entirely. Once a data pulse passes through the buffer, in the "on" state, the pulse generates rfi in that portion of the path beyond the buffer.

Digital systems used for wireless communication, including mobile cellular and satellite telephones, pagers, personal digital assistants (PDAs), and the like (hereafter "mobiles") particularly suffer from rfi from the microprocessor bus. Mobiles typically comprise a rigid housing enclosing a printed circuit board, electronic and electro-acoustic components, a portable power supply such as a battery, and an associated microprocessor for control of the device. Mobiles communicate through a variety of means, primarily through antennas that transmit and receive radio frequency (rf) signals, but also through infrared (IR) emitters and receivers, or cable connections to input/output ports of computers and other mobiles. The user interfaces with the circuitry and microprocessor of the mobile through a keypad located on the front outer surface of the housing. Keys on the keypad are pressed by the user to temporarily close an internal switch and send a signal to the microprocessor where an appropriate routine processes the input and operates the mobile. A display on the housing provides a readout of data input by the user and data received by the mobile, access to spatially navigated menu trees, and graphical user interfaces (GUIs). Radio frequency interference from the mobile microprocessor can interfere with the reliable operation of the mobile, in particular with the reliable operation of mobile communications over radio frequencies.

It is common for rfi from the microprocessor bus of a mobile, such as a cellular telephone, to cause an apparent reduction in sensitivity of the rf receiver of the mobile in the range of 10 dB. This reduction results from the combined effect of increased phase noise contribution, unwanted mixing of spurious tones, and receiver compression which distorts the received signal. The rf signal radiated from the microprocessor bus is a broadband function with a sinc $(sin(x)/x)$ function overlay at the clock frequency of the bus at the access rate. Thus, harmonics of the access frequency as well as a general increase in the apparent noise floor of the received rf signal can be attributed to microprocessor bus activity.

End user groups require that digital radio transceivers encode and decode communication signals within stated bit error rates (BERs) so that communication reliability is maintained in the face of interference resulting from operation of the mobile itself. Radio frequency interference can also lead to difficulties with approval of mobile operations, in particular, because spurious radiation of rf from the mobile microprocessor bus and/or from other sources can interfere with the ability of another mobile in the band of interest to properly decode incoming rf communication signals.

A simple solution is needed to mitigate rfi from microprocessor buses due to digital pulses travelling on the bus. Such a solution would ideally be inexpensive, would not compromise the physical length of the bus, and would not interfere with other components in the system used to control communication flow.

SUMMARY OF THE INVENTION
(DISCLOSURE OF THE INVENTION)

A primary object of the present invention is to mitigate rfi from the microprocessor bus. The present invention mitigates rfi from the bus by controlling the wait states for the transmission of signals to peripherals and attenuating radio frequencies in the signal pulses to levels which will limit their radiation based on the geometry and size of the bus.

A primary advantage of the present invention is the reduction of harmful rfi from the microprocessor bus. Another advantage of the present invention is that it is inexpensive to implement. Yet another advantage of the present invention is that it can be readily tuned for particular applications. Still another advantage of the present invention is that it can be implemented in combination with other methods of controlling communication over the microprocessor bus.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DESCRIPTION OF THE PREFERRED EMBODIMENTS

Best Modes For Carrying Out The Invention

Figure 1:
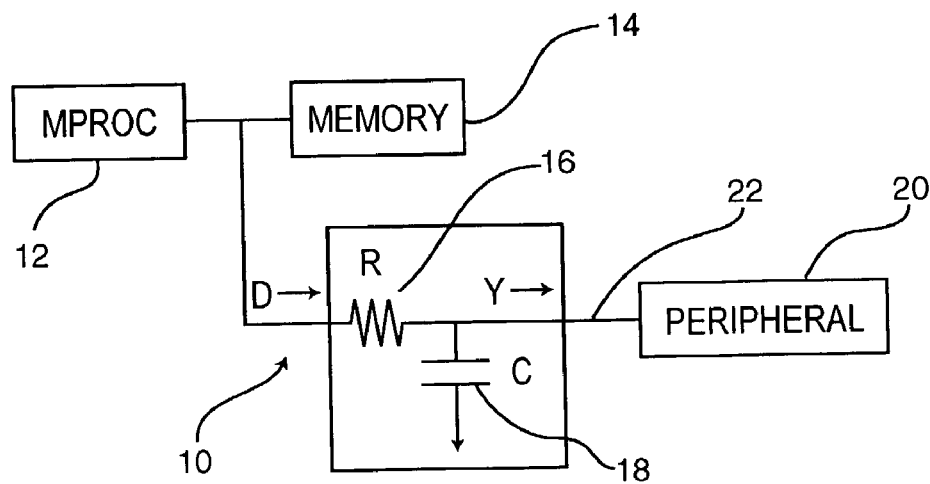
FIG. 1 is a schematic diagram illustrating a first embodiment of the present invention for a low-pass filter network on a microprocessor bus.

Referring to FIG. 1, a schematic diagram of a first embodiment of the present invention for a low-pass filter network 10 on the microprocessor bus is shown. A typical digital system includes a microprocessor, or central processing unit (CPU), 12 for control of the overall operation of the system, as well as any peripherals associated with it. Microprocessor 12 is connected to system memory 14, also defined herein as a peripheral, but shown on the figures for ease of demonstrating applications of the invention.

Memory 14 provides microprocessor 12 with instructions to control operation of the system, including such operations as modem and display operations and interaction with the user via a user interface. Memory 14 also provides data storage. For example, in a mobile communication device, memory provides instruction to the mobile microprocessor for control of modem operations, display operations, radio tuning, and interaction with a user via a keypad and user interface functions. Mobile memory also provides temporary storage of data such as network variables and other structures necessary for proper operation of the mobile.

Returning to FIG. 1, microprocessor 12 communicates with and controls peripheral 20 by sending digital signals over microprocessor bus 22. In this embodiment of the invention, a low-pass filter network 10 is implemented as close as physically possible to the junction of the bus connection to microprocessor 12 and memory 14. Low-pass filter network 10 comprises resistance (R) 16 placed in the signal path of bus 22 near microprocessor 12 and capacitance (C) 18 connected between the peripheral side of resistance 16 and ground.

As used herein, "resistance" refers to a single resistor, or a combination of resistors, such that the required amount of resistance is provided. Similarly, "capacitance" is used herein to refer to a single capacitor or a plurality of capacitors, such that the required capacitance is provided. Single resistors and capacitors are depicted in the figures for ease of demonstrating the principles of the invention.

Resistance 16 serves to limit the electrical current through bus 22. Capacitance 18 charges and discharges according to the amount of current entering capacitance 18 from bus 22 after passing through resistance 16. The time constant $\tau$ for the RC network has the value:

$$\tau=RC. \qquad (1)$$

RC network 10 operates as a passive low-pass filter, allowing frequencies below the cutoff frequency ($f_c$) to pass network 10 while not allowing frequencies above the cutoff frequency to pass. The cutoff frequency and filter order are based on the values of resistance 16 and capacitance 18 and the configuration of the RC network, where $$f_c = \frac{1}{2\pi RC}. \qquad (2)$$

Figure 3:
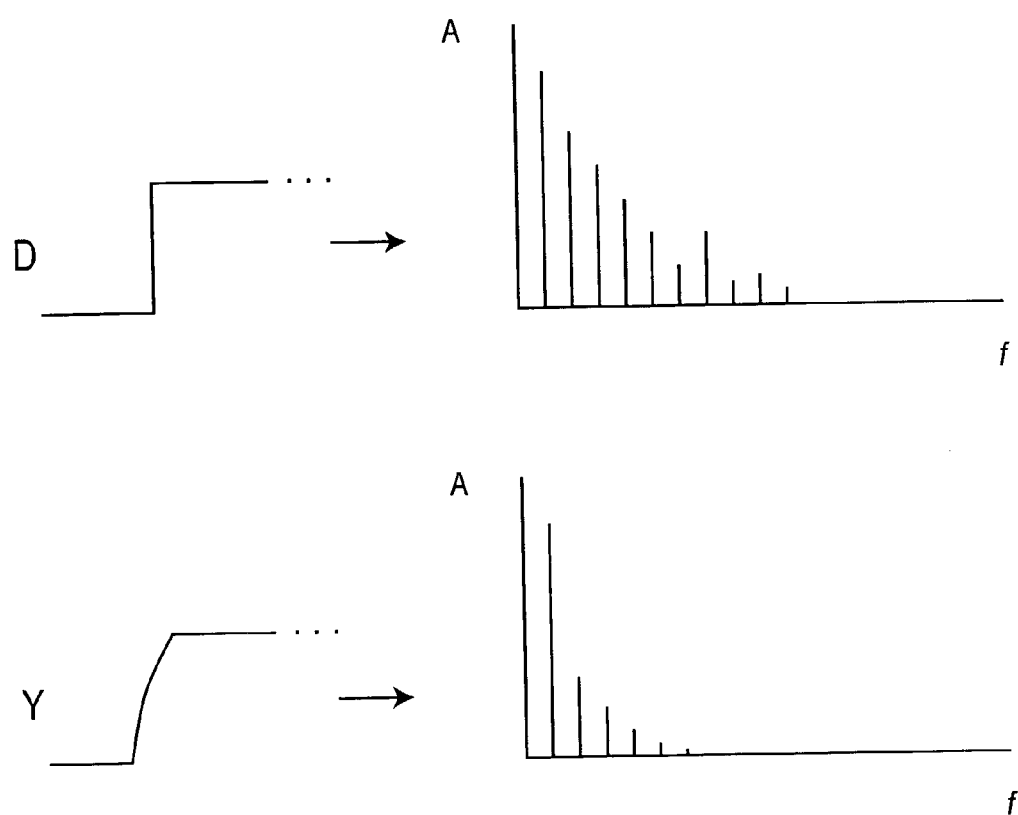
FIG. 3 is a diagram showing a hypothetical unfiltered pulse (D) and its associated spectral content, as well as a hypothetical pulse (Y) having passed through a low-pass filter and its associated spectral content.

Referring to FIG. 3, a diagram of a hypothetical, unfiltered pulse (D) and its associated spectral content, as well as hypothetical pulse (Y) having passed through a low-pass filter and its associated spectral content, is shown. As depicted in FIG. 3, an unfiltered pulse (D) having a sharp rise time has a broad frequency spectrum. A pulse passed through a low-pass filter, (Y), shown in the lower portion of FIG. 3, has a narrower spectrum, the amplitude of the higher frequencies being attenuated by the low-pass filter.

The present invention is implemented such that higher frequencies on bus 22, in the rf range, are attenuated to levels low enough not to be radiated from bus 22. Passing the signal pulses through a low-pass filter has the added effect of extending the pulse transition time from low to high, or high to low. Thus, the value of the time constant $\tau$ for the RC network contributes to the determination of the "write" wait state requirement from microprocessor 12 to peripheral 20. If the transition time is extended by the filter such that it exceeds the wait state period for a particular peripheral, the number of wait states are increased to accommodate the filtering process. Adjustment of the wait state is accomplished by suitable means within the microprocessor. However, the number of wait states necessary for optimum performance of the peripheral is balanced against the reduction in rfi gained by filtering the data signal. In general, adding wait states, if necessary, to communication with particular peripherals to accommodate the filtering process has a negligible effect on the overall operating speed of the system, and is outweighed by the benefits obtained from reduced rfi from microprocessor bus 22.

Figure 2:
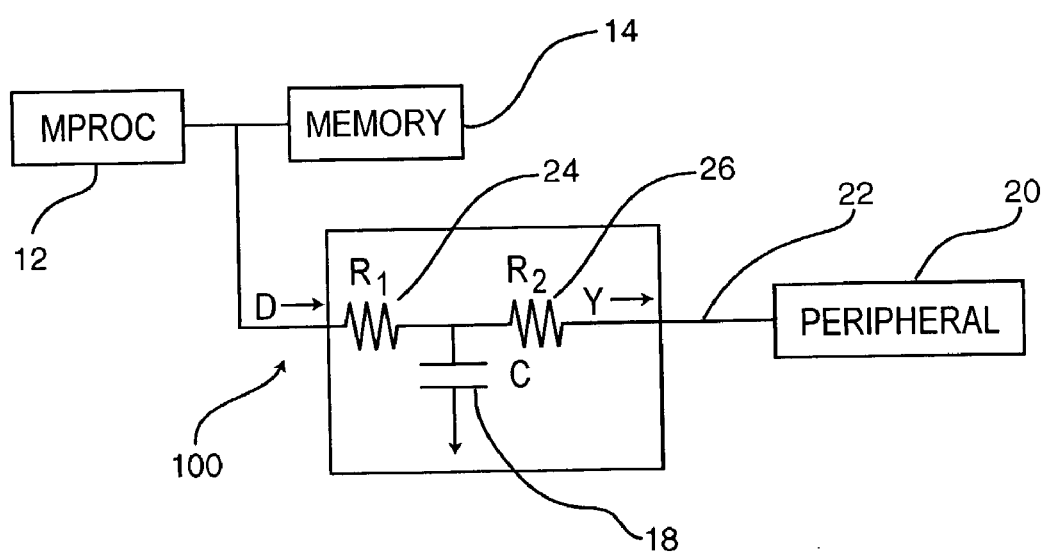
FIG. 2 is a schematic diagram illustrating a second embodiment of the present invention for a low-pass filter network on a microprocessor bus.

Referring to FIG. 2, a second embodiment of the present invention for a low-pass filter network 100 on the microprocessor bus is shown. In this embodiment an additional resistance ($R_2$) is placed in the path of bus 22 after capacitance 18. As in the first embodiment of the invention, low-pass filter network 100 is implemented as close as physically possible to the junction of the bus connection to microprocessor 12 and memory 14. Effectively, the first embodiment depicted in FIG. 1 is identical to this second embodiment, if $R_2$ is assigned a value of zero. In this embodiment:

$$\tau_1=R_1C, \text{ and} \qquad (3)$$

$$\tau_2=R_2C \qquad (4)$$

The time constant $\tau_1$ contributes to the determination of the "write" wait state requirement from microprocessor 12 to peripheral 20, while $\tau_2$ contributes to the determination of the "read" wait state requirement from peripheral 20 to microprocessor 12.

A third embodiment of the invention results by setting the value of $R_1$ in the second embodiment of FIG. 2 to zero, effectively leaving the capacitance C between the terminal of $R_2$ nearest the microprocessor and ground.

It will understood by those of skill in the art that low-pass filter networks 10 and 100 can be placed in the path between microprocessor 12 and memory 14 to serve the same purpose of reducing rfi from the microprocessor bus. It will also be understood that the invention can be implemented such that multiple peripherals share a common RC network, or such that each peripheral has a separate RC network optimized for communication with that peripheral.

Although simple passive low-pass filter designs are depicted in the figures, it will be understood by those of skill in the art that a variety of passive and active filter designs can be implemented in accordance with the present invention to achieve the result of mitigating undesired rfi from the microprocessor bus.

Variables to consider in the design of the low-pass filter include the number of additional wait states that may be required to communicate with a particular peripheral; the desired cutoff frequency of the filter; the order (number of "poles") of the filter; intrinsic, or "parasitic", resistance and capacitance in the system, such as that existing on the bus trace as well as parasitic capacitance and source resistance of the pin drivers of the peripheral; and the cost of implementing a particular design.

The invention is further illustrated by the following non-limiting example.

EXAMPLE

The present invention can be implemented on the microprocessor bus of a mobile communication device. The microprocessor bus of a mobile is usually relatively short in length. However, longer microprocessor bus traces may extend to particular mobile peripherals, such as an LCD. For example, if the LCD is 80 mm from the microprocessor, then the bus trace carrying the bus signals to the LCD effectively becomes an 80 mm antenna for radiating rfi to the mobile antenna. If all of the rfi to the mobile antenna were from this particular bus trace to the LCD, then the RC values for the filter network of the present invention are calculated to achieve the desired degree of attenuation of rfi from this trace. That is, the signal carrier to interference ratio (C/I) would be maximized by the filter network to a level that would enable the mobile to operate effectively.

Hypothetically, if the required C/I was 12 dB and the received C/I was only 8 dB, then the RC network would be designed to attenuate the interfering frequency by at least 4 dB. In this example, if the operating frequency was 13 MHz and the intended received channel was 858 MHz, then the RC network would be designed to attenuate the $66^{th}$ harmonic by at least 4 dB. It will be understood that typical applications require attenuation of a range of frequencies, or of a variety of different frequencies, and the invention is not limited to the attenuation of a particular frequency as exemplified here.

Although the invention has been described in detail with particular reference to these embodiments, other embodiments can achieve the same results. Variations and modifications of the present invention will be obvious to those skilled in the art and it is intended to cover in the appended claims all such modifications and equivalents.

What is claimed is:

1. In a system including a peripheral, a microprocessor configured to adjust a wait state used to control the timing of communications between the microprocessor and the peripheral, a ground terminal, and a microprocessor bus for carrying digital signals between the microprocessor and the peripheral, a low-pass filter located in the signal path of the microprocessor bus between the microprocessor and the peripheral, said low-pass filter for attenuating radio frequencies from the digital signals traveling on the microprocessor bus.

2. The apparatus of claim 1 wherein said low pass filter is located in proximity to the junction of the microprocessor, a memory in communication with the microprocessor, and the microprocessor bus.

3. In a system including a peripheral, a microprocessor configured to adjust a wait state used to control the timing of communications between the microprocessor and the peripheral, a ground terminal, and a microprocessor bus for carrying digital signals between the microprocessor and the peripheral, an apparatus for mitigating radio frequency interference from the microprocessor bus, said apparatus comprising:
 a first resistance in the signal path of the bus between the microprocessor and the peripheral; and
 a capacitance between a terminal of said first resistance and the ground terminal.

4. The apparatus of claim 3 wherein a terminal of said capacitance is connected to a terminal of said first resistance nearest the peripheral, and another terminal of said capacitance is connected to the ground terminal.

5. The apparatus of claim 4 further comprising a second resistance in the signal path of the bus, said second resistance having a terminal connected to the junction comprised of said first resistance and said capacitance, and having another terminal connected in series with the peripheral.

6. The apparatus of claim 3 wherein a terminal of said capacitance is connected to a terminal of said first resistance nearest the microprocessor, and another terminal of said capacitance is connected to the ground terminal.

7. The apparatus of claim 6 further comprising a second resistance in the signal path of the bus, said second resistance having a terminal connected to the junction comprised of said first resistance and said capacitance, and having another terminal connected in series with the microprocessor.

8. A method of mitigating radio frequency interference from a microprocessor bus, the method comprising:
 passing a digital signal pulse output by the microprocessor through a low-pass filter such that radio frequencies are attenuated from the pulse; and
 adjusting the wait state used to control the timing of communications between the microprocessor and a peripheral.

9. The method of claim 8 wherein the step of passing a digital signal pulse output by the microprocessor through a low-pass filter comprises passing the digital signal pulse through a low-pass RC network.

10. The method of claim 9 further comprising the step of calculating the resistance and capacitance values for the low-pass RC network based upon the operating frequency and associated harmonics of the microprocessor bus.

11. The method of claim 9 further comprising the step of calculating the resistance and capacitance values for the low-pass RC network based upon the rise time of the digital pulses traveling over the microprocessor bus.

* * * * *